1,431,097.

J. A. CARROLL.
SECTIONAL TIRE FASTENER.
APPLICATION FILED AUG. 18, 1922.

Patented Oct. 3, 1922.
2 SHEETS—SHEET 1.

WITNESSES

Inventor
J. A. Carroll
By Clarence A. O'Brien
Attorney

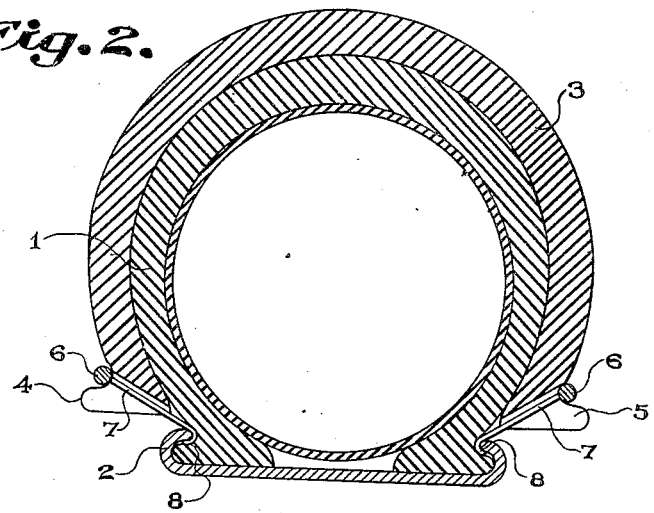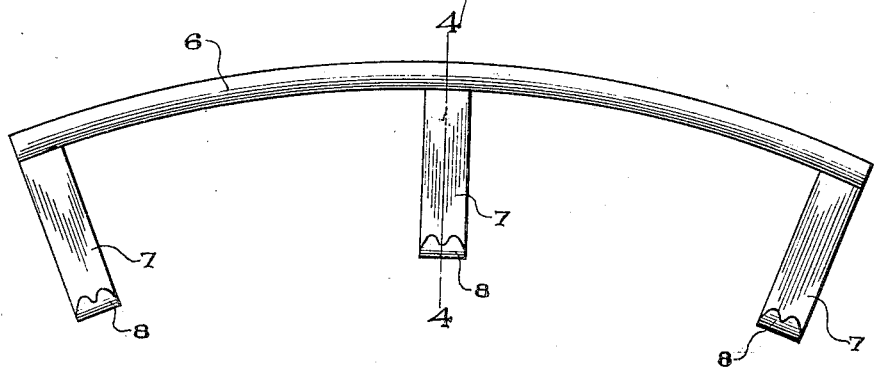

Patented Oct. 3, 1922.

1,431,097

UNITED STATES PATENT OFFICE.

JAMES A. CARROLL, OF BENTONVILLE, ARKANSAS, ASSIGNOR OF ONE-THIRD TO WILLIAM B. PAINE, OF BENTONVILLE, ARKANSAS.

SECTIONAL TIRE FASTENER.

Application filed August 18, 1922. Serial No. 582,752.

*To all whom it may concern:*

Be it known that I, JAMES A. CARROLL, a citizen of the United States, residing at Bentonville, in the county of Benton and State of Arkansas, have invented new and useful Improvements in Sectional Tire Fasteners, of which the following is a specification.

In carrying out the present invention it is my purpose to provide a fastening device by means of which a worn shoe or casing, when cut into sections, may be applied to a pneumatic tire and securely fastened thereon, so as to enable the sections of the old shoe to be used, thereby prolonging the life of the inner shoe and enabling the maximum mileage to be obtained from the tire.

It is also my purpose to provide a fastening device of the class described which will embrace the desired features of simplicity, efficiency and durability, which may be manufactured and marketed at small cost and which will embody comparatively few parts and these so arranged and correlated as to reduce the possibility of derangement to a minimum.

With the above recited objects in view, and others of a similar nature, the invention resides in the construction, combination and arrangement of parts set forth in and falling within the scope of the appended claims.

In the accompanying drawings:

Figure 2 is a cross sectional view through the same.

Figure 3 is an enlarged side elevation of my improved fastening device.

Figure 1:
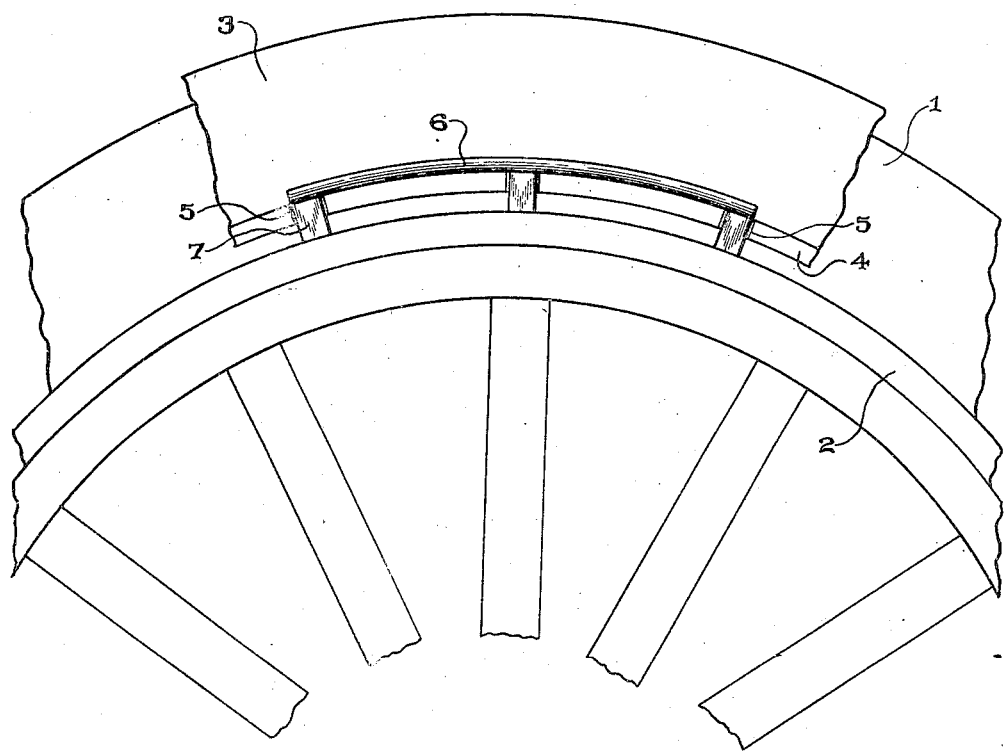
Figure 1 is a fragmentary side elevation of a tire showing a section of a shoe fastened thereto by means of my invention.
Figure 4:
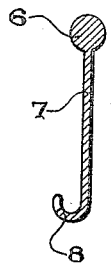
Figure 4 is a sectional view on the line 4—4 of Figure 3.

Referring now to the drawings in detail, 1 designates a tire of the pneumatic type embodying an outer shoe or casing and an inner tube, both being mounted upon a rim 2 of the clincher type.

In the practice of my invention I take an old shoe or casing and cut the same into a number of sections, one of which sections indicated by the numeral 3. These sections 3 are placed about the tire 1 in end to end relation, so as to cover the tread of the casing of the tire. Each section 3 at each bead 4 thereof is cut out, as at 5, and these cut-out portions are spaced apart equal distances along the bead 4 of the particular section 3.

My improved fastening device comprises a rod 6 preferably circular in cross section and curved longitudinally to conform to the curvature of the section 3 at the bead. Integral with the rod 6 and depending therefrom are fingers 7 spaced apart distances corresponding to the cut-out portions 5 and fitting into the respective cut-out portions. These fingers 7 extend from the rod 6 toward the adjacent side of the rim 2 and the rim ends of the fingers are formed with hooks 8 that hook over the flange of the rim 2, as clearly illustrated in Figure 2 of the drawings. Thus, the sections 3 of the old casing are securely and effectively fastened in position on the tire and held to the rim.

If desired, the rod 6 may be formed of two sections connected together by means of an adjustable connection, such for instance as a turn buckle, so that the length of the section 6 may be changed or varied whenever necessary or desired.

In practice, the inner tube and casing, after being assembled on the rim, are deflated and the old casing cut into sections applied over the tread portion of the tire casing. The rods 6 are now placed in engagement with the beads on the respective sections 3 and the fingers 7 of the rods are extended through the cut-out portions 5 in the beads of the sections 3, the hooks 8 being engaged over the flanges of the rim 2. The tire 1 is now inflated and upon inflation the sections 3 are stretched, thereby enabling the fastening devices to securely hold the sections 3 in position on the tire and prevent creeping of such sections around the tire.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. The combination with a pneumatic tire and a rim of the clincher type on which said tire is mounted, and a casing cut into sections and arranged about the tread portion of said tire, the beads of each section being cut out at spaced intervals, of a tire fastener comprising a rod fitting against each bead of each section, and fingers integral with said rod and passed through said cut-out portions, respectively, and engaged with said clincher rim.

2. The combination with a pneumatic tire and a rim of the clincher type on which said tire is mounted, and a casing cut into sections and arranged about the tread portion of said tire, the beads of each section being cut out at spaced intervals, of a tire fastener comprising a rod fitting against each bead of each section, fingers integral with said rod and passed through said cut-out portions, respectively, and having their rim ends formed with hooks engaging over the adjacent flange of said clincher rim.

3. A sectional tire fastening device of the class described comprising a rod circular in cross section and curved longitudinally to conform to the curvature of the sectional tire bead and fingers integral with said rod spaced apart along the same and having their rim engaging ends formed with hooks.

In testimony whereof I affix my signature.

JAMES A. CARROLL.